April 24, 1962 S. CHYTIL 3,031,120
AUTOMATICALLY THREADING MOTION PICTURE PROJECTOR
Filed March 18, 1960 3 Sheets-Sheet 1

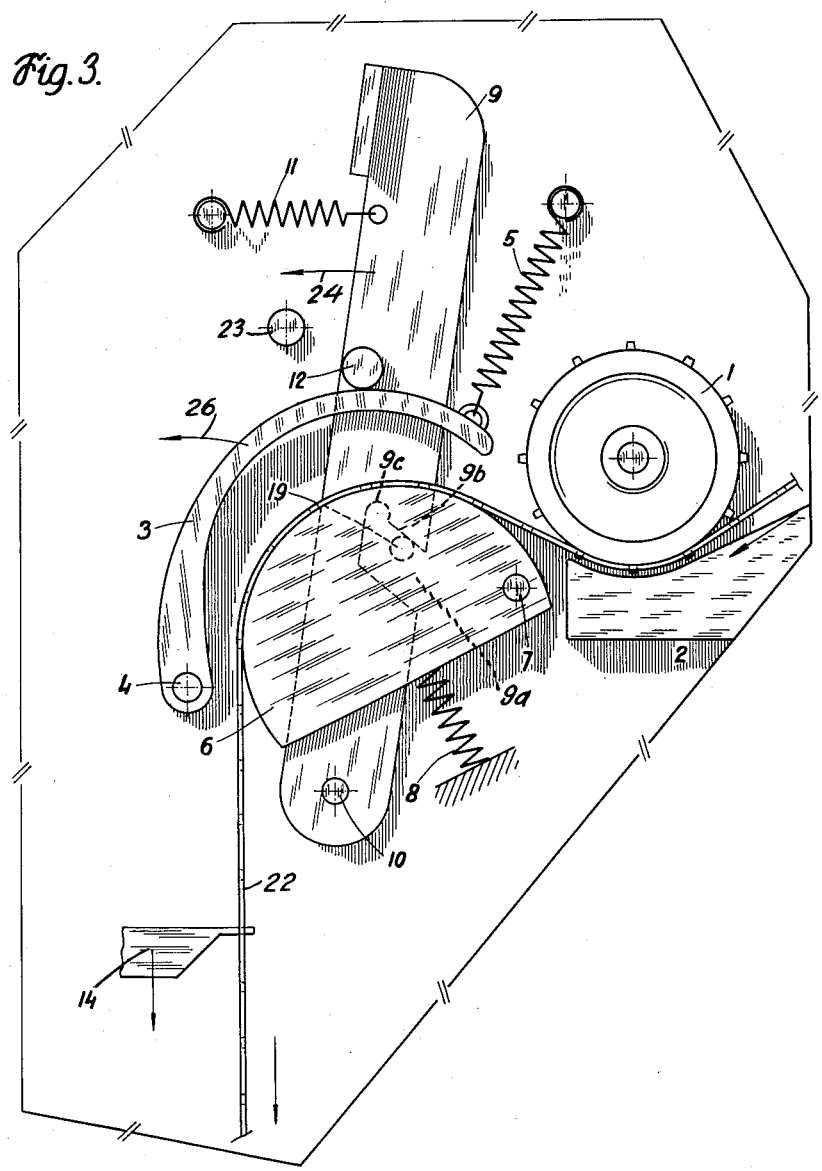

United States Patent Office 3,031,120
Patented Apr. 24, 1962

1

3,031,120
AUTOMATICALLY THREADING MOTION
PICTURE PROJECTOR
Slavomír Chytil, Prerov, Czechoslovakia, assignor to Meopta, narodni podnik, Prerov, Czechoslovakia
Filed Mar. 18, 1960, Ser. No. 16,101
Claims priority, application Czechoslovakia Mar. 21, 1959
7 Claims. (Cl. 226—62)

The present invention relates to motion picture projectors and deals more particularly with a projector adapted for automatic threading of the film.

The manual threading of film into the projector, particularly in the case of film narrower than 35 mm., is slow and relatively difficult, especially when compared with the highly advanced state of other aspects of modern projection technique. Efforts have therefore been made to eliminate this manual operation and to provide a mechanism which would perform the necessary steps automatically.

Known automatic threading mechanisms are relatively complex, and therefore expensive in first cost, subject to breakdown, and difficult to maintain and repair.

The present invention aims at removing the above mentioned drawbacks. The mechanism according to the invention consists essentially of a concave loop forming member and a convex loop forming member, which fit into one another and are pivotally mounted on spaced eccentric pivots, and of a lever equipped with latch means for controlling the movements of the loop forming members.

The mechanism according to the invention is adapted to thread the film automatically through the feed mechanism of the projector without the claw exerting stresses on the perforations of the film. The mechanism is therefore far more dependable in operation and simpler than presently available automatic threading devices. It does not require any attention on the part of the operator during threading.

A preferred embodiment of the present invention is shown by way of example in elevational, partly sectional views in the accompanying drawing, wherein—

Figure 1:
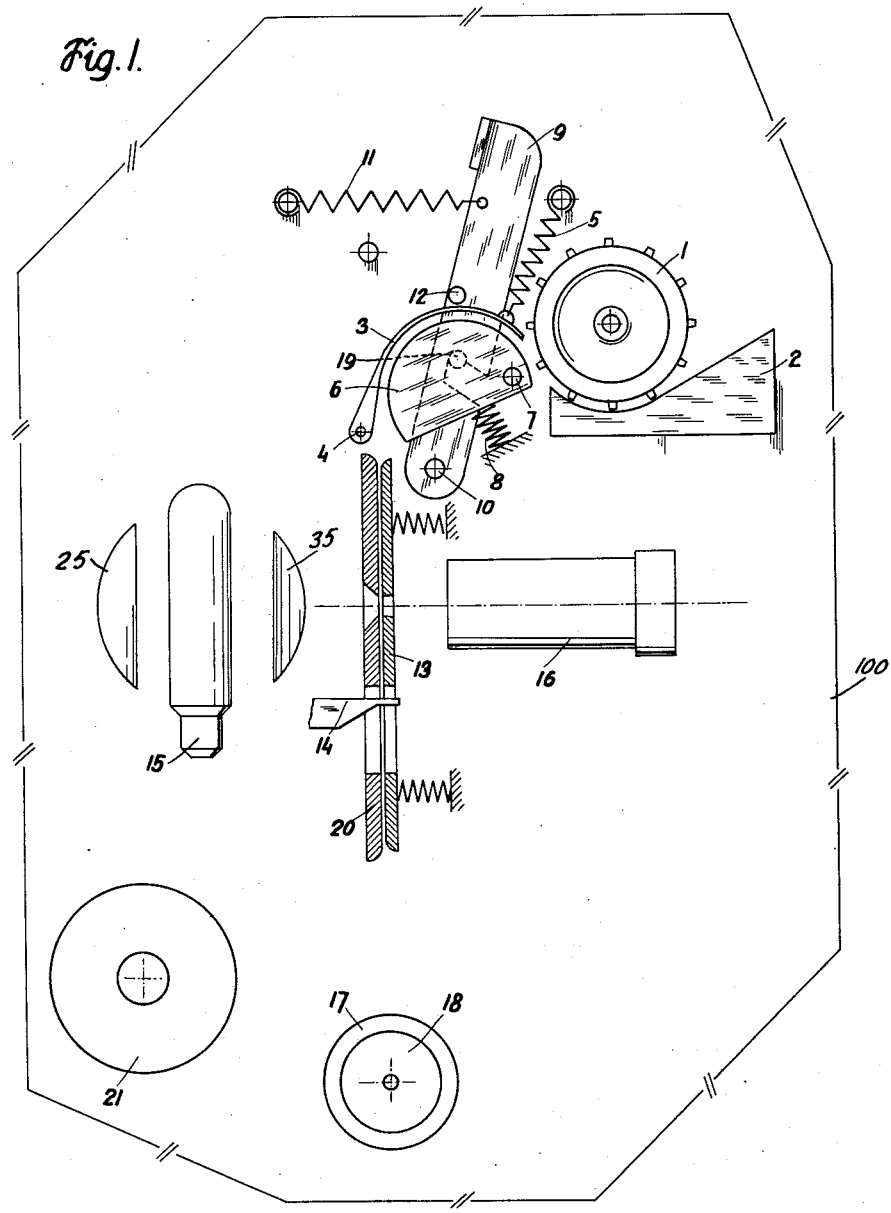
Figure 2:
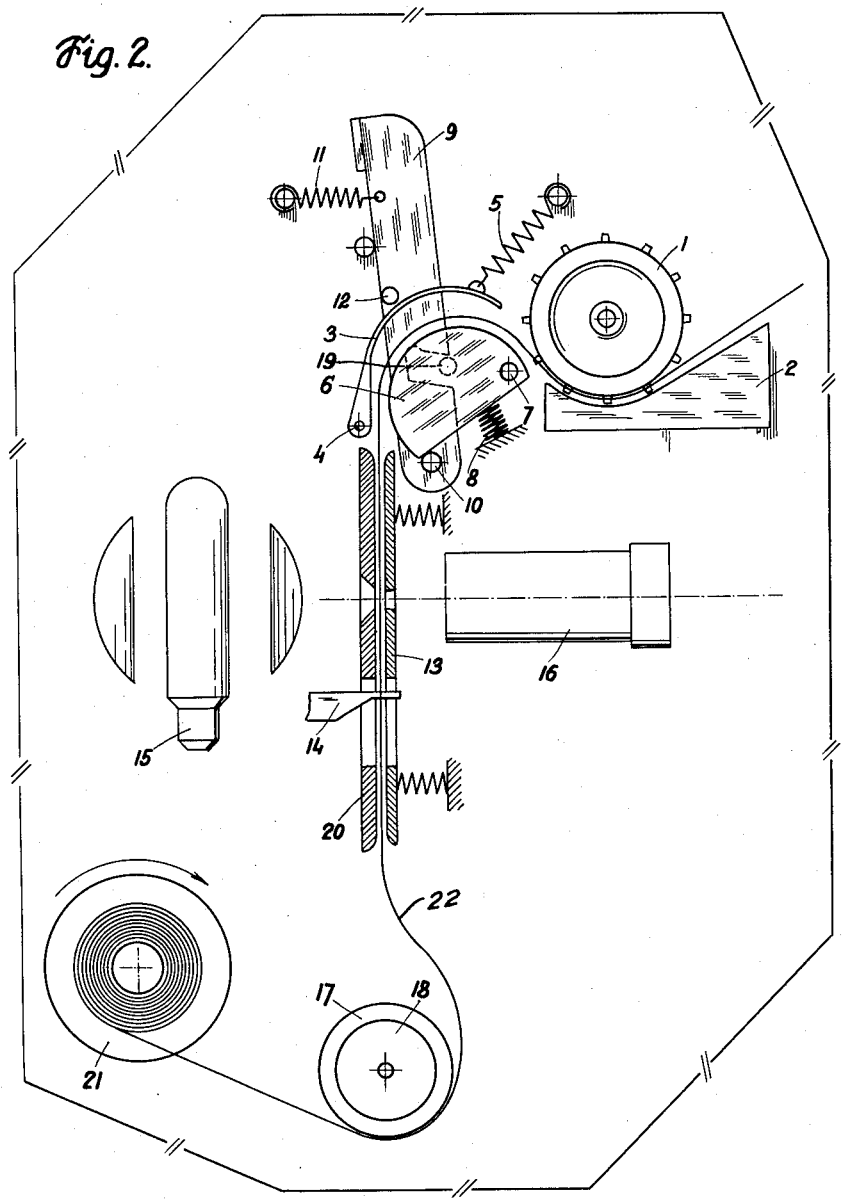

FIG. 1 shows elements of a motion picture projector equipped with the threading mechanism of the invention and prepared to receive the film, FIG. 2 shows the projector of FIG. 1 with the film in the operating position, and FIG. 3 shows a detail of the mechanism of FIGS. 1 and 2 on an enlarged scale in a position intermediate those of FIGS. 1 and 2.

Referring now to the drawing in detail, and initially to FIG. 1, there is seen a motion picture projector in a fragmentary side elevational and partly sectional view, only those elements of the projector being shown which are directly relevant to this invention.

A feed sprocket 1 is mounted on a side wall 100 of the projector. The sprocket is equipped with peripheral teeth spaced to engage the correspondingly spaced lateral perforations of the film which is to be projected. The sprocket is connected with the projector drive in the conventional manner for continuous rotation. A fixed guide member 2 is mounted on the wall 100 adjacent the feed sprocket 1 in such a manner as to define with the latter a wedge shaped guide channel for guiding the leading edge portion of a film into engagement with the teeth of the feed sprocket.

An arcuately bent loop-forming member 3 is pivotably mounted on the wall 100 by means of a pin 4 in such a manner that the concave inner face of the loop forming member 3 in the threading position illustrated in FIG. 1 has a common tangent with the sprocket 1. One end of a tension spring 5 is fastened to the wall 100, and the other end is secured to an edge portion of the loop forming member 3 adjacent the sprocket 1 and remote from the pin 4 to urge the loop forming member into counterclockwise pivoting movement about the axis of the pin 4, as viewed in FIG. 1.

A second loop forming member 6 is pivotally mounted on the wall 100 by means of a pin 7 and is urged into clockwise movement about the pin axis by a compression spring 8 fastened to the wall 100. The second loop forming member has a convex face which in the threading position of the apparatus has a common axis of curvature with the concave face of the first-mentioned looping member 3, and a common tagent with the sprocket 1.

A control lever 9 is pivoted on the wall 100 by means of the pin 10 mounted on one end of the lever 9 and is urged into counterclockwise pivoting movement about the pin axis, as viewed in FIG. 1, by a tension spring 11. The free end of the lever 9 is enlarged to provide an abutment face for an operator's finger. The lever 9 carries a pin 12 which limits counterclockwise movement of the loop forming member 3 about the pin 4.

The concave face of the loop forming member 3 and the convex face of the loop forming member 6 jointly define a narrow arcuate guide channel for a film fed by the sprocket 1. The dimensions of the channel are such as to prevent buckling of the film when it passes through the channel. The entrance end of the channel is closely adjacent the feed sprocket 1. The exit end of the channel is immediately adjacent the film gate of the projector which is formed by an aperture plate 20 and a pressure plate 13 in the conventional manner. The plates 13 and 20 are arranged face to face and provide a passage for the film therebetween. A claw 14 passes through corresponding openings in the plates 13 and 20 to engage one of the film perforations. The claw is connected in the usual manner with a drive mechanism which causes the claw to advance the film stepwise by the height of one frame.

The optical system of the camera is schematically indicated by the showing of an illuminating apparatus consisting of an electric light bulb 15, a reflector 25, and a condenser lens 35, and of a lens barrel 16 containing the objective lens or lenses.

The film expelled from the gate by the intermittent movement imparted thereto by the claw 14 is guided over an idler pulley 18 provided with a rubber sleeve 17, and is wound on a driven wind-up spool 21 as is conventional.

FIG. 2 shows the apparatus of FIG. 1 in the operating position during projection of the film 22. In this position, the loop forming members 3 and 6 are spaced apart to widen the guide channel between their respective concave and convex faces and to permit the alternating tensioning and slackening of the loop portion of the film 22 between the sprocket 1 and the claw 14 which is necessary in film feeding mechanisms of this type.

The operation of the aforedescribed apparatus will now be described with reference to FIG. 3 which illustrates on a larger scale only those elements of the apparatus of FIGS. 1 and 2 which are directly responsible for feeding the film 22 towards and through the gate 13, 20.

The lever 9 is formed with an obliquely transverse notch 9a approximately opposite the pin 7. The notch is engaged by a pin 19 on the loop forming member 6 which is urged against one wall 9b of the notch 9a by the pressure of the spring 8. When the lever 9 moves clockwise, as viewed in FIG. 3, the pin 19 moves inwardly of the notch 9a along the wall 9b and finally drops into a recess 9c of the wall 9b, thereby stopping further clockwise movement of the lever 9 and arresting the lever in the position seen in FIG. 1. Counterclockwise movement of the lever in the direction of the arrow 24 is limited by a stop 23 fixedly mounted on the wall 100.

When a film is to be threaded into the projector, the lever 9 is manually pivoted clockwise against the restraint of the spring 11 until the pin 19 drops into the recess 9c. The pin 12 on the lever simultaneously pivots the loop forming member 3 clockwise in the direction of the arrow 26 and the spring 8 rotates the loop forming member 6 clockwise as far as engagement of the pin 19 with the recess 9c permits. The position of the apparatus at the end of the clockwise manually actuated stroke of the lever 9 is illustrated in FIG. 1. The apparatus is ready for threading.

The leading edge of a film 22 is introduced into the wedge-shaped guide channel between the rotating sprocket 1 and the fixed guide member 2 until one of the sprocket teeth engages a perforation of the film. From this stage, the device operates fully automatically.

The leading edge of the film is smoothly pushed by the feed sprocket 1 through the narrow guide channel between the curved faces of the loop forming members 3 and 6 into the passage between the plates 13 and 20 the entrance end of which is somewhat flared. The movement of the film so far is continuous and its speed substantially uniform in accordance with the circumferential speed of the feed sprocket 1.

Eventually a perforation of the film near the leading edge is engaged by the claw 14 and the leading film edge is pulled down at a speed greatly in excess of the circumferential speed of the sprocket 1. The resulting tensioning of the film loop between the sprocket 1 and the claw 14 causes pressure to be exerted on the concave face of the loop forming member 6 in a radial direction toward the center of curvature of the face. Since the member 6 is rotatably fastened by the eccentric pin 7, it is pivoted by the pressure in a counterclockwise direction against the pressure of the spring 8. The pin 19 is thereby withdrawn from the recess 9c and the lever 9 is free to follow the urging of the spring 11 and to pivot counterclockwise.

FIG. 3 shows the apparatus in an intermediate condition immediately following upon tensioning of the leading film portion by the claw 14. The threading device eventually reaches the position illustrated in FIG. 2 in which the lever 9 abuts against the stop 23 thereby permitting the loop forming member 3 to swing counterclockwise from its threading position to widen the guide channel for the film. The movement of the lever 9 also pivots the other loop forming member 6 counterclockwise about its pin 7 in the direction of further widening of the guide channel because of the camming cooperation of the notch wall 9b with the pin 19.

The operating position of the apparatus illustrated in FIG. 2 permits the film loop between the sprocket 1 and the gate 13, 20 to expand and to contract as required by the different modes of movement of the sprocket 1 and of the claw 14. The film remains out of contact with the curved faces of the loop forming members 3 and 6 during these movements of the loop. The apparatus remains in the operating position until it is manually reset to the threading position shown in FIG. 1 in the aforedescribed manner.

It should be understood of course that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim is:

1. In a motion picture apparatus, in combination, gate means; claw means engageable with a film for moving the same intermittently past said gate means at a predetermined instantaneous speed; feed sprocket means engageable with said film for continuously feeding said film toward said gate means at a speed smaller than said instantaneous speed; loop forming means including a first member having convexly arcuate face means, and a second member having concavely arcuate face means opposite said convexly arcuate face means, said face means defining therebetween an arcuate portion of a film path extending from said feed sprocket means to said loop forming means, and thence to said claw means, said members being movable toward and away from each other between a threading position in which said face means are adjacent each other, and an operating position in which said face means are remote from each other; and actuating means responsive to pressure exerted on said convex face means in a radially inward direction for moving said members from said threading position thereof to said operating position.

2. In an apparatus as set forth in claim 1, means for returning said members from said operating to said threading position thereof.

3. In an apparatus as set forth in claim 2, said returning means being manually operable.

4. In an apparatus as set forth in claim 1, said actuating means including resilient means permanently urging said members to move from said threading to said operating position thereof; latch means retaining said members in said threading position; and release means responsive to said pressure for releasing said latch means.

5. In a motion picture projector, in combination, a support; an apertured plate defining a film gate; a claw movable on said support for intermittently moving a film past said gate at a predetermined instantaneous speed; a feed sprocket continuously rotatable on said support for feeding said film toward said gate at a speed smaller than said instantaneous speed; two loop forming members having respective opposite convex and concave faces, said faces defining therebetween a portion of a film path extending from said feed sprocket to said claw, at least one of said members being movable on said support between a threading position in which said opposite faces are spacedly adjacent each other and an operating position in which said opposite faces are remote from each other; and actuating means responsive to pressure exerted on said convex face for moving said one member from said threading to said operating position thereof.

6. In a projector as set forth in claim 5, said loop forming members being pivoted to said support for rotary movement about respective pivoting axes spaced from the respective axes of curvature of said faces, and said actuating means being effective to rotate said members about the respective pivoting axes thereof from said threading to said operating position.

7. In a motion picture arrangement, in combination, gate means; an elongated motion picture film; claw means in engagement with a first longitudinal portion of said film for moving the same intermittently past said gate means at a predetermined instantaneous speed; feed sprocket means in engagement with a second longitudinal portion of said film for continuously feeding said film toward said claw means at a speed smaller than said instantaneous speed, whereby a portion of said film intermediate said first and second portions is alternatingly tensioned and slackened; loop forming means including a first member having convexly arcuate face means, and a second member having concavely arcuate face means opposite said convexly arcuate face means, said members being movable toward and away from each other between a threading position in which said face means are adjacent each other, and an operating position in which said face means are remote from each other, said intermediate portion of said film passing in an arcuate path between said face means; and actuating means responsive to said tightening of said film for moving said members from said threading position thereof to said operating position.

References Cited in the file of this patent

UNITED STATES PATENTS

| | | |
|---|---|---|
| 2,420,587 | Dietrich | May 13, 1947 |
| 2,846,216 | Tholstrup | Aug. 5, 1958 |